US012016512B2

(12) United States Patent
Hwang et al.

(10) Patent No.: US 12,016,512 B2
(45) Date of Patent: Jun. 25, 2024

(54) CLEANER

(71) Applicant: LG Electronics Inc., Seoul (KR)

(72) Inventors: Jungbae Hwang, Seoul (KR); Sangyoung Song, Seoul (KR); Taekgi Lee, Seoul (KR); Jinrae Cho, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 18/181,917

(22) Filed: Mar. 10, 2023

(65) Prior Publication Data

US 2023/0210323 A1 Jul. 6, 2023

Related U.S. Application Data

(63) Continuation of application No. 16/261,047, filed on Jan. 29, 2019, now abandoned.

(30) Foreign Application Priority Data

Jan. 29, 2018 (KR) ........................ 10-2018-0010909

(51) Int. Cl.
*A47L 5/24* (2006.01)
*A47L 9/02* (2006.01)
(Continued)

(52) U.S. Cl.
CPC *A47L 5/24* (2013.01); *A47L 9/02* (2013.01); *A47L 9/127* (2013.01); *A47L 9/1608* (2013.01);
(Continued)

(58) Field of Classification Search
CPC ... A47L 5/24; A47L 9/02; A47L 9/127; A47L 9/1608; A47L 9/1635; A47L 9/1641;
(Continued)

(56) References Cited

U.S. PATENT DOCUMENTS 2,524,117 A * 10/1950 Storm, Jr. ................ A47L 5/22
55/504
7,097,680 B2 8/2006 Oh et al.
(Continued)

FOREIGN PATENT DOCUMENTS

CN 107072455 8/2017
EP 3357394 8/2018
(Continued)

OTHER PUBLICATIONS

Office Action in Chinese Appln. No. 202210456890.1, dated Jun. 1, 2023, 16 pages (with English translation).
(Continued)

*Primary Examiner* — Steven M Cernoch
*Assistant Examiner* — Jonathan R Zaworski
(74) *Attorney, Agent, or Firm* — Fish & Richardson P.C.

(57) ABSTRACT

The cleaner includes a suction inlet configured to guide air and dusts, a main body including a first cyclone unit configured to separate the air and the dusts, which are suctioned through the suction inlet, from each other, and a dust separation module separably connected to the main body and including a second cyclone unit configured to separate the dusts from the air discharged from the first cyclone unit.

20 Claims, 11 Drawing Sheets

(51) Int. Cl.

| | |
|---|---|
| ***A47L 9/12*** | (2006.01) |
| ***A47L 9/16*** | (2006.01) |
| ***A47L 9/22*** | (2006.01) |
| ***A47L 9/28*** | (2006.01) |
| ***A47L 9/32*** | (2006.01) |
| ***B04C 3/04*** | (2006.01) |
| ***B04C 3/06*** | (2006.01) |
| ***B04C 9/00*** | (2006.01) |

(52) U.S. Cl.
CPC ........... *A47L 9/1633* (2013.01); *A47L 9/1641* (2013.01); *A47L 9/1666* (2013.01); *A47L 9/1683* (2013.01); *A47L 9/1691* (2013.01); *A47L 9/22* (2013.01); *A47L 9/2884* (2013.01); *A47L 9/322* (2013.01); *B04C 3/04* (2013.01); *B04C 3/06* (2013.01); *B04C 9/00* (2013.01); *B04C 2009/002* (2013.01); *B04C 2009/005* (2013.01)

(58) Field of Classification Search
CPC .......... A47L 9/1683; A47L 9/22; A47L 9/288; A47L 9/2884; A47L 9/322
USPC ............................................................ 15/353
See application file for complete search history.

(56) References Cited

U.S. PATENT DOCUMENTS 7,169,201 B2 1/2007 Oh et al.
7,294,159 B2 11/2007 Oh et al.
7,361,200 B2 4/2008 Oh et al.
7,678,166 B2 * 3/2010 Yoo .......................... B04C 5/26 55/459.3
7,722,693 B2 * 5/2010 Yoo ...................... A47L 9/1683 55/455
7,731,770 B2 * 6/2010 Strutt .................... A47L 9/1641 55/342
8,156,609 B2 * 4/2012 Milne ....................... A47L 5/24 15/352
8,945,258 B2 * 2/2015 Smith ..................... A47L 9/009 55/424
9,572,467 B2 2/2017 Dyson et al.
10,111,567 B2 10/2018 Son et al.
10,188,249 B2 1/2019 Son et al.
10,258,209 B2 * 4/2019 Song ......................... A47L 5/24
10,285,552 B2 * 5/2019 Marsden ................. A47L 5/362
10,299,648 B2 * 5/2019 Peters ................... A47L 9/1683
10,517,453 B2 * 12/2019 Hyun .................... A47L 9/1666
10,575,689 B2 * 3/2020 Nam ..................... A47L 9/1616
11,229,337 B2 1/2022 Nam et al.
2009/0282639 A1 * 11/2009 Dyson ..................... A47L 9/122 15/344
2009/0307863 A1 * 12/2009 Milne ....................... B04C 5/08 15/344
2009/0307864 A1 * 12/2009 Dyson ..................... A47L 9/322 15/344
2010/0251507 A1 * 10/2010 Conrad ..................... A47L 5/28 15/347
2012/0210537 A1 * 8/2012 Makarov ............... A47L 9/1608 15/353
2013/0091658 A1 * 4/2013 Smith ................... A47L 9/1625 15/347
2013/0091814 A1 * 4/2013 Smith ................... A47L 9/1691 55/345
2013/0118960 A1 * 5/2013 Tandon ................ B01D 21/267 210/512.2
2014/0223871 A1 * 8/2014 Makarov ................ B01D 45/16 55/343
2016/0037987 A1 * 2/2016 Caro ......................... A47L 9/04 15/334
2016/0150931 A1 * 6/2016 Kim ....................... B01D 45/16 15/353
2017/0215663 A1 * 8/2017 Conrad ................... A47L 13/22
2017/0280951 A1 * 10/2017 Nam ..................... A47L 9/1616
2017/0332860 A1 * 11/2017 Nam ......................... A47L 9/28
2017/0332864 A1 11/2017 Nam et al.
2018/0199776 A1 7/2018 Sato et al.
2019/0133390 A1 * 5/2019 Nam ......................... A47L 5/28

FOREIGN PATENT DOCUMENTS

JP 4106036 6/2008
JP 2017159023 9/2017
JP 2018000913 1/2018
KR 20150008910 1/2015
KR 20170112853 10/2017
KR 20170112911 10/2017
KR 20170131165 11/2017
TW 200624077 7/2006
TW 200819106 5/2008
TW 201711618 4/2017
TW 201713261 4/2017
TW M553981 1/2018
WO WO-2017057384 A1 * 4/2017 ............... A47L 9/00

OTHER PUBLICATIONS

Extended European Search Report in European Appln. No. 18902960.6, dated Sep. 20, 2021, 7 pages.
Office Action in Japanese Appln. No. 2020-562563, dated Apr. 5, 2022, 6 pages (with English translation).
Office Action in Japanese Appln. No. 2020-562563, dated Aug. 3, 2021, 6 pages (with English translation).
Office Action in Korean Appln. No. 10-2018-0010909, dated Feb. 25, 2022, 10 pages (with English translation).
Taiwan Office Action in TW Appln. No. 108100889, dated Mar. 31, 2021, 6 pages (with English translation).
Taiwan Office Action in TW Appln. No. 109102025, dated Apr. 23, 2021, 6 pages (with English translation).
Taiwanese Office Action in Taiwanese Appln. No. 108100889, dated May 24, 2019, 8 pages (with English translation).
Notice of Allowance in Chinese Appln. No. 202210456890.1, dated Nov. 1, 2023, 8 pages (with English translation).

* cited by examiner

CLEANER

CROSS-REFERENCE TO RELATED APPLICATIONS

The present application is a continuation of U.S. application Ser. No. 16/261,047, filed on Jan. 29, 2019, which claims priority under 35 U.S.C. 119 and 35 U.S.C. 365 to Korean Patent Application No. 10-2018-0010909, filed on Jan. 29, 2018, which are hereby incorporated by reference in their entirety.

BACKGROUND

The present disclosure relates to a cleaner.

A cleaner is a device that performs cleaning by suctioning and wiping dust or foreign substances on a surface to be cleaned.

Cleaners may be classified into a manual cleaner that a user moves in person for cleaning and an automatic cleaner that automatically moves for cleaning.

Manual cleaners may fall into, depending on the types, a canister cleaner, an upright cleaner, a handy cleaner, and a stick cleaner.

A centrifugal separating apparatus is disclosed in Korean Patent Publication No. 10-2009-0026209 that is a prior art document. The centrifugal separating apparatus constitutes a portion of a hand-held cleaner.

The centrifugal separating apparatus includes a cyclone having a wall and a base closing one end of the cyclone.

A cover is provided in the cyclone. The cover includes a cylindrical wall having a plurality of through-holes and an inner wall disposed inside the cylindrical wall.

The centrifugal separating apparatus further includes an additional cyclone assembly, and the additional cyclone assembly includes a cone-shaped opening. The cone-shaped opening is disposed to pass through the inner wall of the cover and communicate with a passage defined by the inner wall.

Also, a dust collector is disposed below the passage. The inside of the duct collector is surrounded by the base.

Dusts are separated from air by the additional cyclone assembly. Here, the dusts separated by the additional cyclone assembly may frequently block the cone-shaped opening. In this case, it is necessary to clean the cone-shaped opening.

However, according to the prior art, even though the base rotates to open the inside of the dust collector, since the cone-shaped opening is disposed inside the cover disposed on an upper portion of the dust collector, it is difficult to allow a user to access to the cone-shaped opening.

SUMMARY

Embodiments provide a cleaner in which a dust separation module including a second cyclone unit is capable of being separated from a main body to clean the second cyclone unit.

Embodiments provide a cleaner in which a filter unit filtering air is separated together with a second cyclone unit to clean the filter unit.

Embodiments provide a cleaner in which a dust separation module is easily separated by a user, and a coupled state of the dust separation module to the main body is maintained when the dust separation module is coupled to the main body.

Embodiments provide a cleaner in which a filter unit is fixed in position without using a separate fixing unit.

Embodiments provide a cleaner in which a second cyclone unit is provided on a main body in a state of being mounted on the main body to maintain sealing between a discharge guide, to which the second cyclone unit is coupled, and a contact part of the second cyclone unit.

In one embodiment, a cleaner includes: a suction inlet configured to guide air and dusts; a main body including a first cyclone unit configured to separate the air and the dusts, which are suctioned through the suction inlet, from each other; and a dust separation module separably connected to the main body and including a second cyclone unit configured to separate the dusts from the air discharged from the first cyclone unit.

In another embodiment, a cleaner includes: a suction inlet configured to guide air and dusts; a suction motor configured to generate suction force to suction the air through the suction inlet; a motor housing configured to accommodate the suction motor; a first cyclone unit configured to separate the dusts from the air suctioned through the suction inlet; a second cyclone unit configured to separate the dusts from the air discharged from the first cyclone unit; and a discharge guide coupled to the second cyclone unit and configured to surround at least a portion of the motor housing, wherein a passage configured to guide the air discharged from the second cyclone unit is provided between the discharge guide and the motor housing.

In further another embodiment, a cleaner includes: a suction inlet configured to guide air and dusts; a first cyclone unit configured to separate the dusts from the air suctioned through the suction inlet; a second cyclone unit configured to separate the dusts from the air discharged from the first cyclone unit; and a discharge guide to which the dust separation module is separably coupled and which guides the air discharged from the second cyclone unit, wherein the discharge guide includes a first coupling part to be coupled to the dust separation module, and the dust separation module includes a second coupling part to be coupled to the first coupling part.

The details of one or more embodiments are set forth in the accompanying drawings and the description below. Other features will be apparent from the description and drawings, and from the claims.

DETAILED DESCRIPTION OF THE EMBODIMENTS

Figure 1:
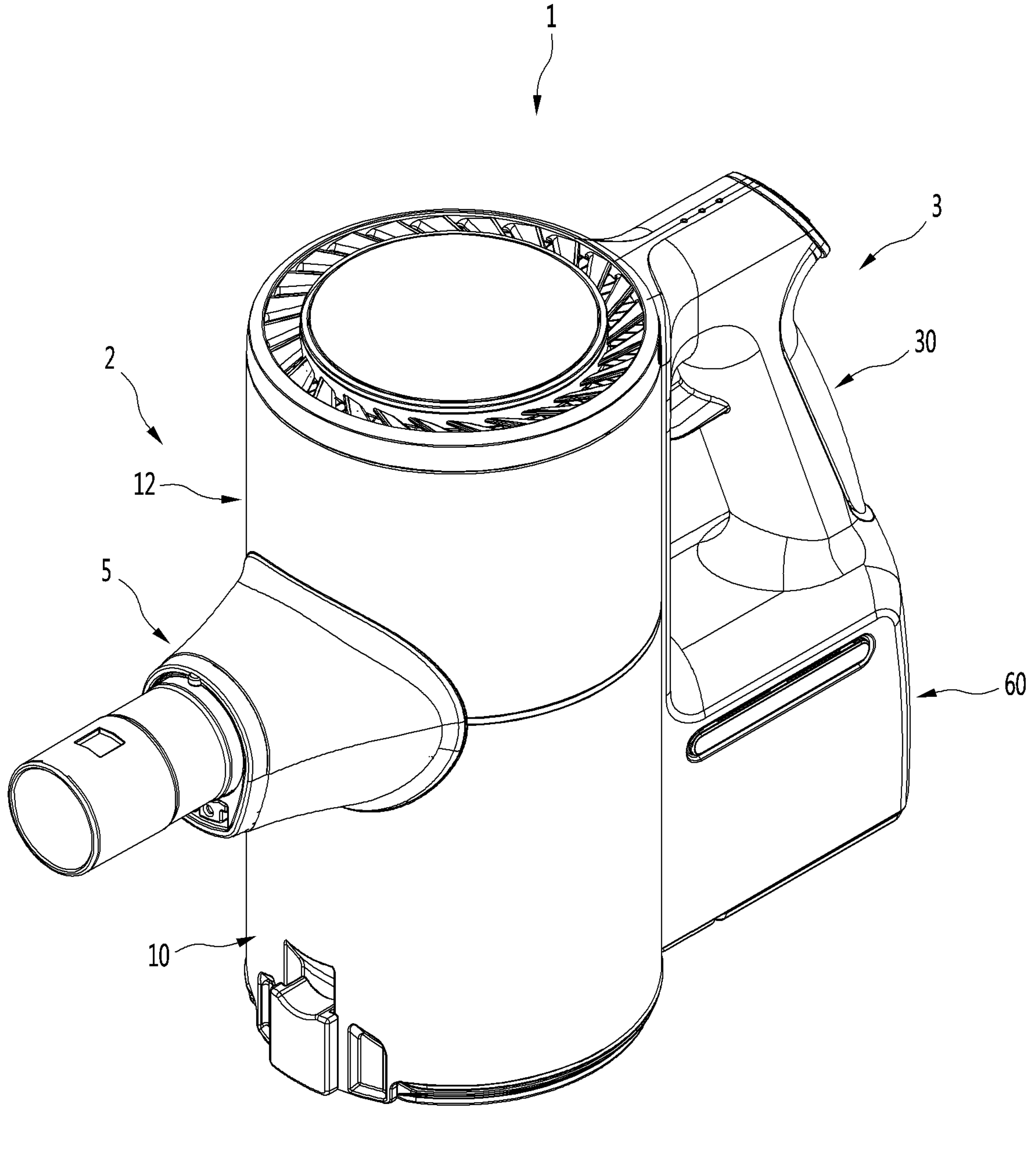
FIG. 1 is a perspective view of a cleaner according to an embodiment.

Hereinafter, some embodiments of the present disclosure will be described in detail with reference to the accompanying drawings. It should be noted that when components in the drawings are designated by reference numerals, the same components have the same reference numerals as far as possible even though the components are illustrated in different drawings. Further, in description of embodiments of the present disclosure, when it is determined that detailed descriptions of well-known configurations or functions disturb understanding of the embodiments of the present disclosure, the detailed descriptions will be omitted.

Also, in the description of the embodiments of the present disclosure, the terms such as first, second, A, B, (a) and (b) may be used. Each of the terms is merely used to distinguish the corresponding component from other components, and does not delimit an essence, an order or a sequence of the corresponding component. It should be understood that when one component is "connected", "coupled" or "joined" to another component, the former may be directly connected or jointed to the latter or may be "connected", coupled" or "joined" to the latter with a third component interposed therebetween.

Figure 2:
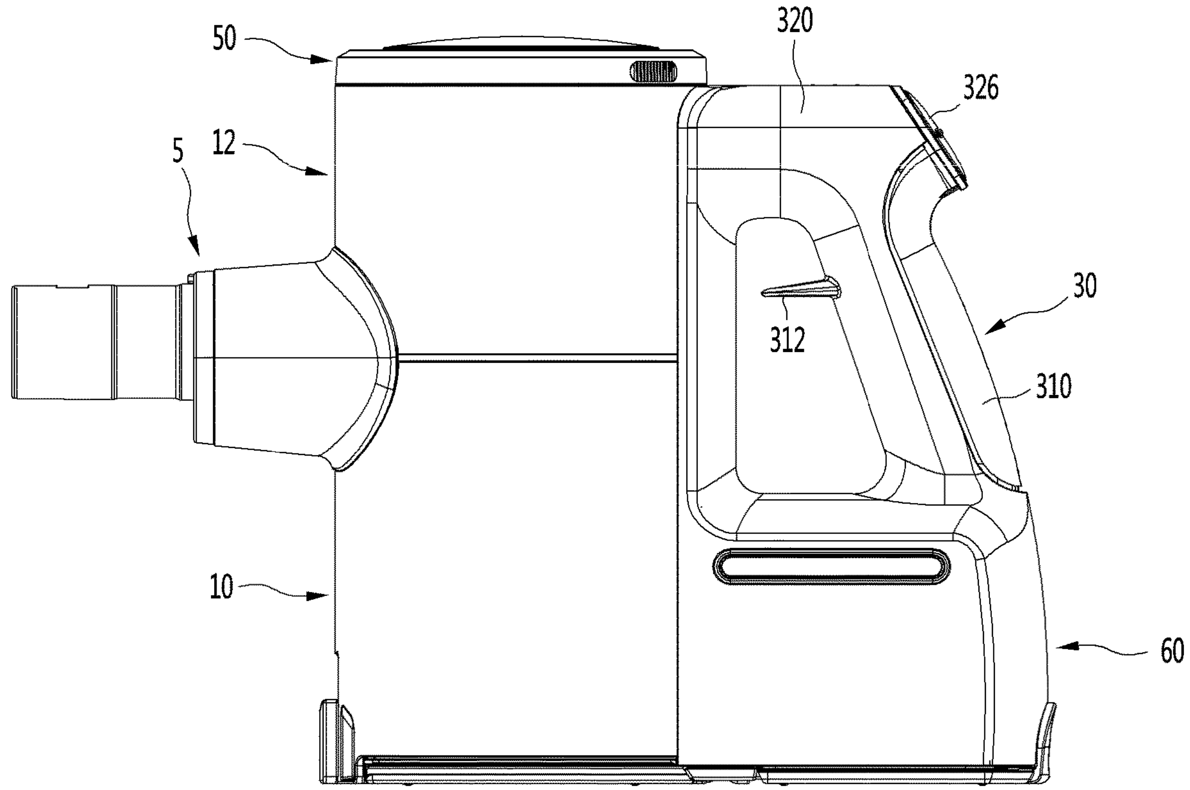
FIG. 2 is a side view of the cleaner according to an embodiment.
Figure 3:
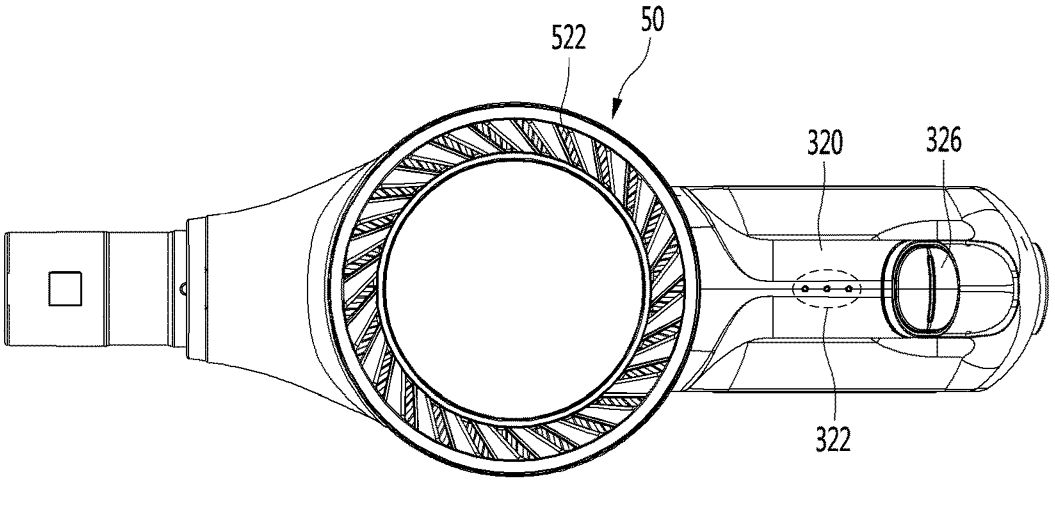
FIG. 3 is a plan view of the cleaner according to an embodiment.
Figure 4:
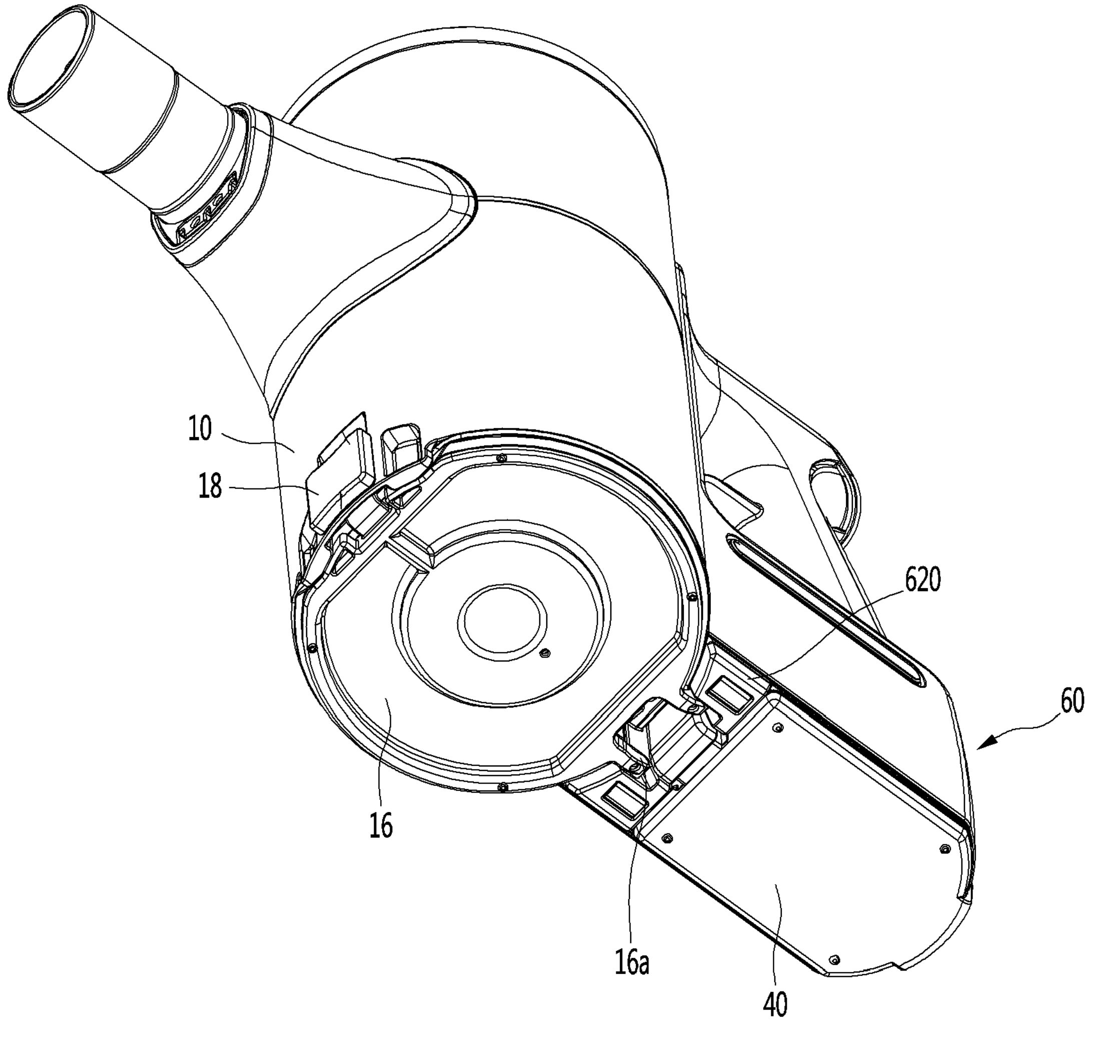
FIG. 4 is a perspective view of the cleaner according to an embodiment when seen from under the cleaner.
Figure 5:
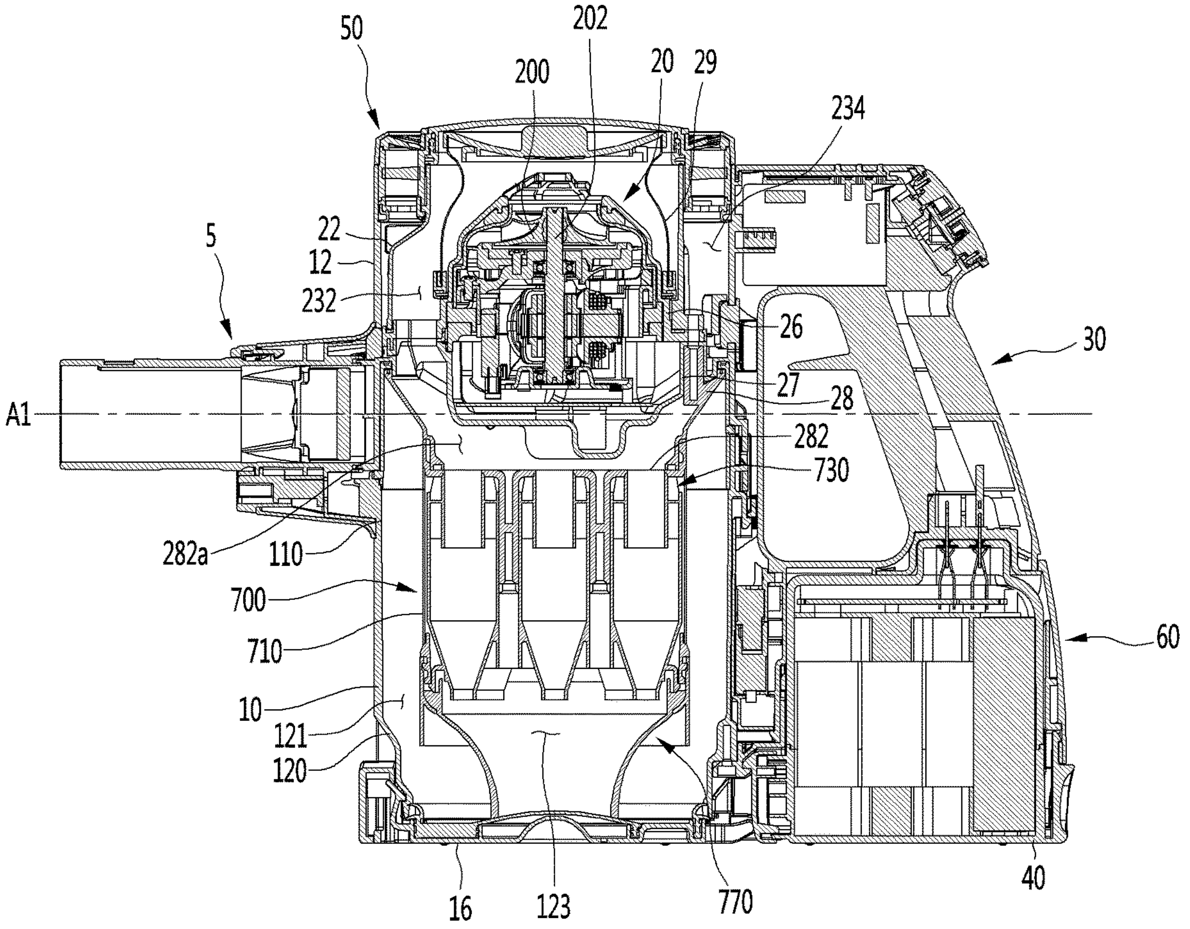
FIG. 5 is a vertical cross-sectional view of the cleaner according to an embodiment.

FIG. 1 is a perspective view of a cleaner according to an embodiment, FIG. 2 is a side view of the cleaner according to an embodiment, FIG. 3 is a plan view of the cleaner according to an embodiment, FIG. 4 is a perspective view of the cleaner according to an embodiment when seen from under the cleaner, and FIG. 5 is a cross-sectional view of the cleaner according to an embodiment.

Referring to FIGS. 1 to 5, a cleaner 1 according to an embodiment may include a main body 2.

The cleaner 1 may further include a suction inlet 5 coupled to the front of the main body 2. The suction inlet 5 can guide air containing dust into the main body 2. A suction pipe or nozzle is connected to the suction inlet 5.

The cleaner 1 may further include a handle unit 3 coupled to the main body 2. The handle unit 3 may be positioned opposite to the suction inlet 5 on the main body 2.

That is, the main body 2 may be disposed between the suction inlet 5 and the handle unit 3.

The main body 2 may include a first body 10 and a second body 12 on the first body 10. The first body 10 and the second body 12 may be directly combined or may be indirectly combined through an intermediate member.

The first body 10 and the second body 12 may be, though not limited thereto, formed in a cylindrical shape.

The first body 10 and the second body 12 are open at the top and the bottom, respectively. That is, the bodies 10 and 12 may have a top opening and a bottom opening, respectively.

The suction inlet 5 may be coupled to the main body 2 such that the center of the suction inlet 5 is positioned approximately at the boundary between the first body 10 and the second body 12.

The main body 2 may further include a dust separation unit that separates dust from air suctioned through the suction inlet 5.

The dust separation unit may include a first cyclone unit 110 that can separate dust, for example, using cyclonic flow. The first body 10 includes the first cyclone unit 110 in this configuration.

The air and dust suctioned through the suction inlet 5 helically flow along the inner side of the first cyclone unit 110.

The axis of the cyclonic flow in the first cyclone unit 110 may vertically extend.

The dust separation unit may further include a dust separation module 700 in which dusts are separated again from the air that is primarily separated from the dusts in the first cyclone unit 110.

The dust separation module 700 may further include a second cyclone unit 730. Here, the second cyclone unit 730 may be disposed in the first cyclone unit 110 so that the dust separation unit is minimized in size.

The first body 10 may further include a dust container 120 storing the dusts separated in the each of the cyclone units 110 and 730. For example, an upper portion of the first body 10 may be the first cyclone unit 110, and a lower portion of the first body 10 may be the dust container 120.

The main body 2 may further a body cover 16 opening and closing a lower side of the dust container 120. The body cover 16 may open and close the dust container 120 through a high operation thereof. A button 18 manipulated to allow the body cover 16 to rotate may be provided on the dust container 120.

A hinge 16*a* of the body cover 16 may be coupled to a hinge coupling part 620 provided on a battery housing 60.

At least a portion of the second cyclone unit 730 may be disposed in the first body 10.

The dust separation module 700 may guide the air separated from the dusts in the first cyclone unit 110 to the second cyclone unit 730.

Also, the dust separation module 700 may filter the air flowing from the first cyclone unit 110 to the second cyclone unit 730. For this, the dust separation module 700 may further include a filter unit 710.

Also, the dust separation module 700 may store the dusts separated in the second cyclone unit 730. For this, the dust separation module 700 may further include a storage unit 770.

The filter unit 710 may surround the second cyclone unit 730.

The storage unit 770 may contact a top surface of the body cover 16. The storage unit 770 may partition an inner space of the first body 10 into a first dust storage part 121 storing the dusts separated in the first cyclone unit 110 and a second dust storage part 123 storing the dusts separated in the second cyclone unit 730.

A space defined by the storage unit 770 may be the second dust storage part 123, and a space between the storage unit 770 and the first body 10 may be the first dust storage part 121.

The body cover 16 can open/close both of the first dust storage part 121 and the second dust storage part 123.

The cleaner 1 may further include a suction motor 20 for generating suction force and a battery 40 for supplying power to the suction motor 20.

The suction motor 20 may be disposed in the second body 12. At least a portion of the suction motor 20 may be disposed over the dust separation unit. Accordingly, the suction motor 20 is disposed over the first body 10.

The suction motor 20 may communicate with an air outlet of the second cyclone unit 730.

To this end, the main body 2 may further include a discharge guide 28 communicated with the second cyclone unit 730 and a flow guide 22 that communicates with the discharge guide 28.

The discharge guide 28 guides the air discharged from the second cyclone unit 730 to the suction motor 20.

For example, the discharge guide 28 is disposed on the second cyclone unit 730 and the flow guide 22 is disposed over the discharge guide 28. Also, for example, the dust separation module 700 may be separably coupled to the discharge guide 28.

A longitudinal axis A1 of the suction part 5 may pass through the discharge guide 28.

Further, at least a portion of the suction motor 20 is positioned inside the flow guide 22.

Accordingly, the axis of the cyclonic flow in the first cyclone unit 110 may pass through the suction motor 20.

When the suction motor 20 is disposed over the second cyclone unit 730, the air discharged from the second cyclone unit 730 can flow directly to the suction motor 20, so the channel between the second cyclone unit 730 and the suction motor 20 can be minimized.

The suction motor 20 may include a rotary impeller 200. The impeller 200 may be fitted on a shaft 202. The shaft 202 is vertically disposed.

An extension line from the shaft 202 (which may be considered as the rotational axis of the impeller 200) may pass through the first body 10. The rotational axis of the impeller 200 and the axis of the cyclonic flow in the first cyclone unit 110 may be on the same line.

According to the present embodiment, there is the advantage that the path through which the air discharged from the dust separation unit, that is, the air discharged upward from the second cyclone unit 730 flows to the suction motor 20 can be reduced and a change in direction of air can be decreased, so a loss of airflow can be reduced.

As the loss of airflow is reduced, suction force can be increased and the lifetime of the battery 40 for supplying power to the suction motor 20 can be increased.

The cleaner 1 may further include a motor housing accommodating the suction motor 20.

The motor housing may include an upper motor housing 26 covering a portion of an upper side of the suction motor 20 and a lower motor housing 27 covering a portion of a lower side of the suction motor 20. The suction motor 20 may be accommodated in each of the motor housings 26 and 27, and the flow guide 22 may be disposed to surround the upper motor housing 26.

A portion of the motor housing may be disposed in the discharge guide 28. For example, at least a portion of the lower motor housing 27 may be disposed in the discharge guide 28. That is, the discharge guide 28 may surround the lower motor housing 27.

An outer surface of the lower motor housing 27 may be spaced apart from the discharge guide 28 to define a passage 282*a*, through which air flows, between an outer surface of the lower motor housing 27 and the discharge guide 28.

The discharge guide 28 may include lower opening 282. The air discharged from the second cyclone unit 730 may pass through the lower opening 282.

At least a portion of the flow guide 22 may be spaced apart from the upper motor housing 26. Further, at least a portion of the flow guide 22 may be spaced apart from the second body 12.

Accordingly, a first air passage 232 is defined by the inner side of the flow guide 22 and the outer side of the upper motor housing 26 and a second air passage 234 is defined by the outer side of the flow guide 22 and the inner side of the second body 12.

The air discharged from the second cyclone unit 730 flows to the suction motor 20 through the first air passage 232 and the air discharged from the suction motor 20 flows through the second air passage 234 and is then discharged outside. Accordingly, the second air passage 234 functions as an exhaust channel.

The handle unit 3 may include a handle 30 for a user to hold and a battery housing 60 under the handle 30.

The handle 30 may be disposed behind the suction motor 20.

As for directions, with respect to the suction motor 20 in the cleaner 1, the direction in which the suction inlet 5 is positioned is the front direction and the direction in which the handle 30 is positioned is the rear direction.

The battery 40 may be disposed behind the first body 10. Accordingly, the suction motor 20 and the battery 40 may be arranged not to vertically overlap each other and may be disposed at different heights.

According to this embodiment, since the suction motor 20 that is heavy is disposed ahead of the handle 30 and the battery 40 that is heavy is disposed behind the handle 30, so weight can be uniformly distributed throughout the cleaner 1. It is possible to prevent injuries to the user's wrist when a user cleans with the handle 30 in his/her hand. That is, since the heavy components are distributed at the front and rear portions and at different heights in the cleaner 1, it is possible to prevent the center of gravity of the cleaner 1 from concentrating on any one side.

Since the battery 40 is disposed under the handle 30 and the suction motor 20 is disposed in front of the handle 30, there is no component over the handle 30. That is, the top of the handle 30 forms a portion of the external appearance of the top of the cleaner 1.

Accordingly, it is possible to prevent any component of the cleaner 1 from coming in contact with the user's arm while the user cleans with the handle 30 in his/her hand.

The handle 30 may include a first extension 310 extending vertically to be held by a user and a second extension 320 extending toward the suction motor 20 over the first extension 310. The second extension 320 may at least partially horizontally extend. In the embodiment, the first extension 310, which is a portion that a user can hold (a portion that a user's palm can come in contact with), may be referred to as a grip part.

A stopper 312 for preventing a user's hand holding the first extension 310 from moving in the longitudinal direction of the first extension 310 (vertically in FIG. 2) may be formed on the first extension 310. The stopper 312 may extend toward the suction inlet 5 from the first extension 310.

The stopper 312 is spaced apart from the second extension 320. Accordingly, a user is supposed to hold the first extension 310, with some of the fingers over the stopper 312 and the other fingers under the stopper 312.

For example, the stopper 312 may be positioned between the index finger and the middle finger.

According to this arrangement, when a user holds the first extension 310, the longitudinal axis A1 of the suction inlet 5 may pass through the user's wrist.

When the longitudinal axis A1 of the suction inlet 5 passes through the user's wrist and the user's arm is stretched, the longitudinal axis A1 of the suction inlet 5 may be substantially aligned with the user's stretched arm. Accordingly, there is the advantage in this state that the user uses minimum force when pushing or pulling the cleaner 1 with the handle 30 in his/her hand.

The handle 30 may include an operation unit 326. For example, the operation unit 326 may be disposed on an inclined surface of the second extension 320. It is possible to input control commands of suction motor 20 through the operation unit 326. For example, it is possible to input instructions to turn on/off the suction motor through the operation unit 326. Further, it is possible to control the intensity of the suction force of the suction motor 20 that has been turned on through the operation unit 326.

The operation unit 326 may be disposed to face a user. The operation unit 326 may be disposed opposite to the stopper 312 with the handle 30 therebetween.

The operation unit 326 may be positioned higher than the stopper 312. Accordingly, a user can easily operate the operation unit 326 with his/her thumb with the first extension 310 in his/her hand.

Further, since the operation unit 390 is positioned outside the first extension 310, it is possible to prevent the operation unit 390 from being unexpectedly operated when a user cleans with the first extension 310 in his/her hand.

A display unit 322 for showing operational states may be disposed on the second extension 320. The display unit 322 may be, for example, disposed on the top of the second extension 320. Accordingly, a user can easily check the display unit 322 on the top of the second extension 320 while cleaning.

The display unit 322, though not limited, may include a plurality of light emitting devices. The light emitting devices may be spaced apart from each other in the longitudinal direction of the second extension 320. The display 322, for example, can show the remaining capacity of the battery 40 and the intensity of the suction motor.

The battery housing 60 may be disposed under the first extension 310 and integrally formed with the first extension 310.

The battery 40 may be detachably received in the battery housing 60. For example, the battery 40 may be inserted into the battery housing 60 from under the battery housing 60.

The rear side of the battery housing 60 and the rear side of the first extension 310 may form a continuous surface. Accordingly, the battery housing 60 and the first extension 310 can be shown like a single unit.

When the battery 40 is inserted in the battery housing 60, the bottom of the battery 40 may be exposed to the outside. Accordingly, when the cleaner 1 is placed on the floor, the battery 40 can be in contact with the floor.

According to this structure, there is the advantage that the battery 40 can be directly separated from the battery housing 60.

Further, since the bottom of the battery 40 is exposed to the outside, the bottom of the battery 40 can come in direct contact with the air outside the cleaner 1, so the battery 40 can be more efficiently cooled.

Referring to FIG. 3, the cleaner 1 may further include a filter unit 50 having air exits 522 for discharging the air that has passed through the suction motor 20. For example, the air exits 522 may include a plurality of openings and the openings may be circumferentially arranged. Accordingly, the air exits 522 may be arranged in a ring shape.

The filter unit 50 may be detachably coupled to the top of the main body 2.

When the filter unit 50 is combined with the main body 2, a portion of the filter unit 50 is positioned outside the second body 12. Accordingly, a portion of the filter unit 50 is inserted in the main body 2 through the open top of the main body 2 and the other portion protrudes outside from the main body 2.

The height of the main body 2 may be substantially the same as the height of the handle 30. Accordingly, the filter unit 50 protrudes upward from the main body 2, so a user can easily hold and separate the filter unit 50.

When the filter unit 50 is combined with the main body 2, the air exits 522 are positioned at the upper portion of the filter unit 50. Accordingly, the air discharged from the suction motor 20 is discharged upward from the main body 2.

According to this embodiment, it is possible to prevent the air discharged from the air exits 522 from flowing to a user while the user cleans using the cleaner 1.

The main body 2 may further include a pre-filter 29 for filtering the air flowing into the suction motor 20. The pre-filter 29 may be disposed inside the flow guide 22. Further, the pre-filter 29 is seated over the upper motor housing 26 and may surround a portion of the upper motor housing 26. That is, the upper motor housing 26 may include a filter support for supporting the pre-filter 29.

Figure 6:
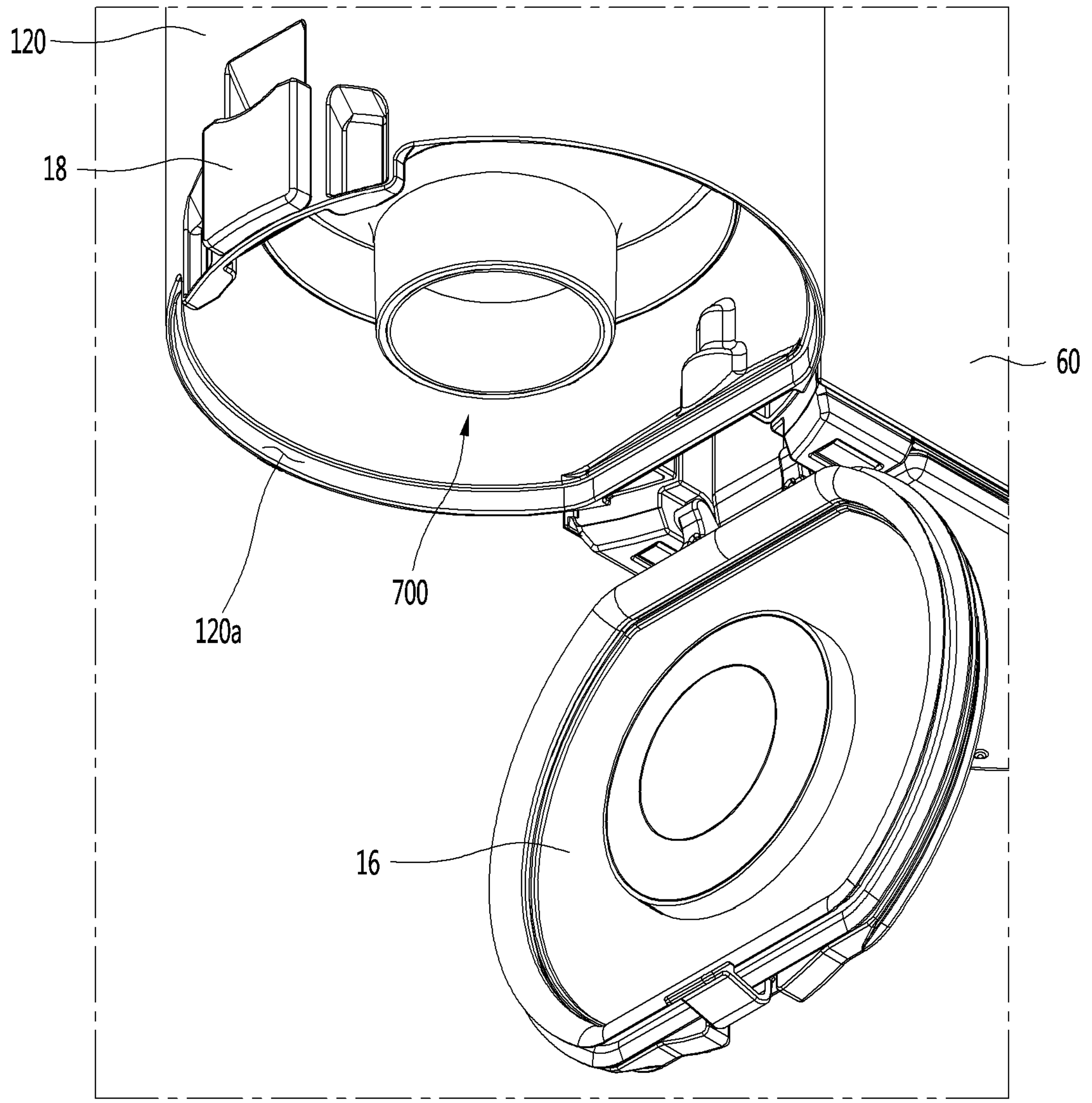
FIG. 6 is a view illustrating a state in which a body cover rotates according to an embodiment.
Figure 7:
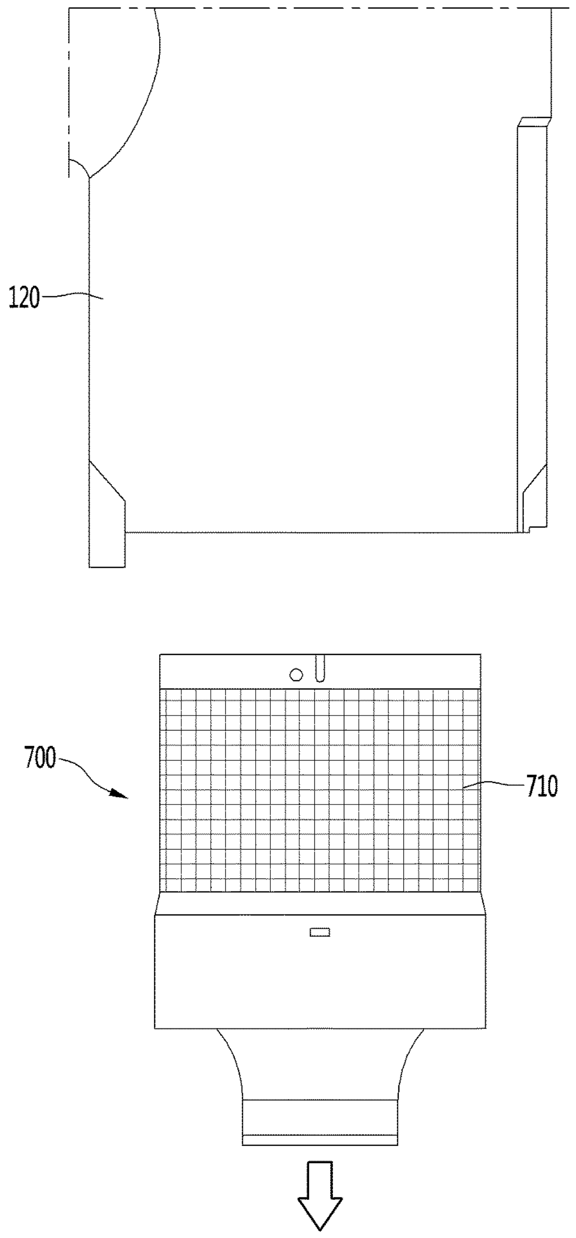
FIGS. 7 and 8 are views illustrating a state in which a dust separation module is separated from a main body according to an embodiment.
Figure 8:
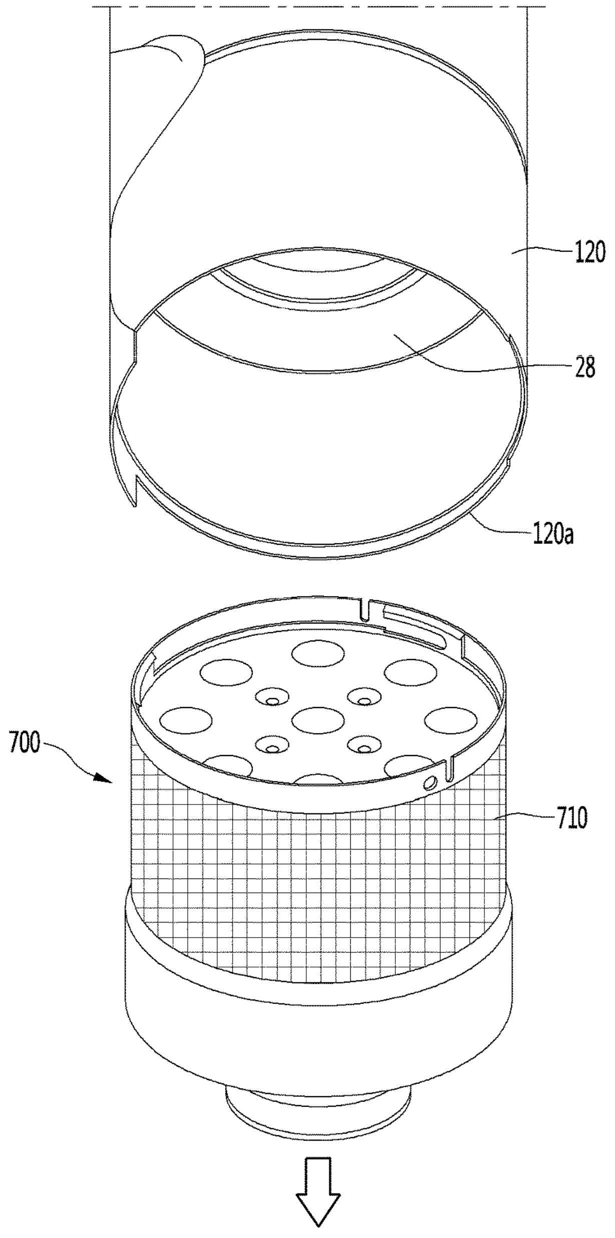

FIG. 6 is a view illustrating a state in which the body cover rotates according to an embodiment, and FIGS. 7 and 8 are views illustrating a state in which the dust separation module is separated from the main body according to an embodiment.

Referring to FIGS. 6 to 8, when the button 18 is manipulated to allow the body cover 16 to rotate, the body cover 16 may rotate around the hinge **16*a* to open the lower side of the dust container 120**.

When the body cover 16 opens the lower side of the dust container 120, at least the storage unit 770 of the dust separation module 700 may be exposed to the outside.

In the state in which the body cover 16 closes the dust container 120, the storage unit 770 may be seated on the body cover 16. When the body cover 16 opens the dust container 120, a lower side of the storage unit 770 may be disposed close to a discharge opening **120*a* of the dust container 120. Here, the discharge opening 120*a* is a portion through the dusts are discharge to empty the dusts out of the dust container 120**.

As described above, the dust separation module 700 may be separably connected to the main body 10 (for example, the discharge guide 28).

Thus, the user may separate the dust separation module 700 downward from the main body 2 in a state of grasping the storage unit 770 of the dust separation module 700 through the discharge opening **120*a***.

The dust separation module 700 may be withdrawn to the outside of the main body 2 through the discharge opening **120*a***.

Since the discharge guide 28 includes the lower opening 282, when the dust separation module 700 is withdrawn to the outside of the main body 2, the motor housing, e.g., the lower motor housing 27 may be exposed to the outside.

Since the dust separation module 700 includes the filter unit 710 and the second cyclone unit 730, when the dust separation module 700 is separated from the main body 2, the user may easily clean the filter unit 710 and the second cyclone unit 730.

According to this embodiment, since the filter unit 710 and the second cyclone unit 730 are cleaned, a dust discharge hole of the filter unit 710 or the second cyclone unit 730 may be prevented from being blocked or prevented the blocked state from being maintained, thereby preventing dust separation performance from being deteriorated.

Also, when the dust separation module 700 is separated from the main body 2, the user may be easily accessible to the inner space of the first body 10 to easily clean an inner circumferential surface of the first body 10.

At least a portion of the first body 10 may be made of a transparent material. Thus, in the state in which the inner circumferential surface of the first body 10 is cleaned, an amount of dusts stored in the first dust storage part 121 may be confirmed through the first body 10.

In this embodiment, since the user easily cleans the inner circumferential surface of the first body 10, the amount of dusts stored in the first dust storage part 121 may be more precisely confirmed.

Figure 9:
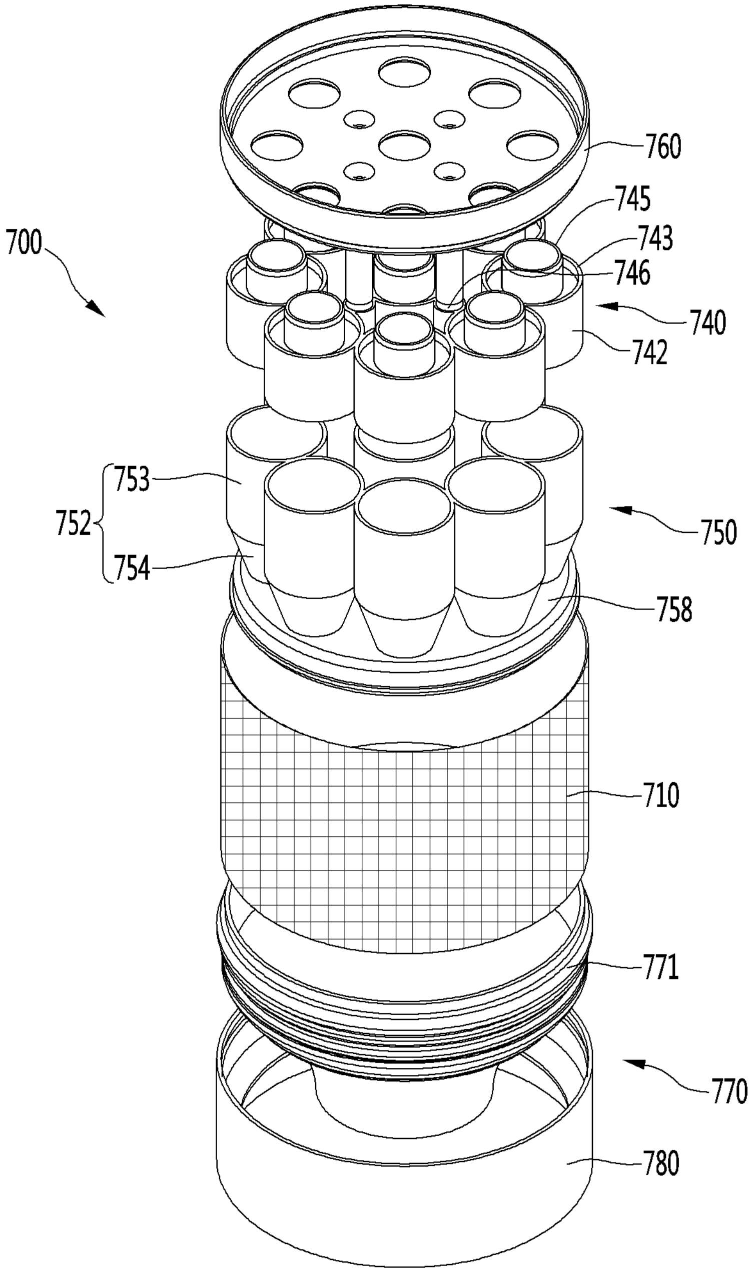
FIG. 9 is an exploded perspective view of the dust separation module according to an embodiment.
Figure 10:
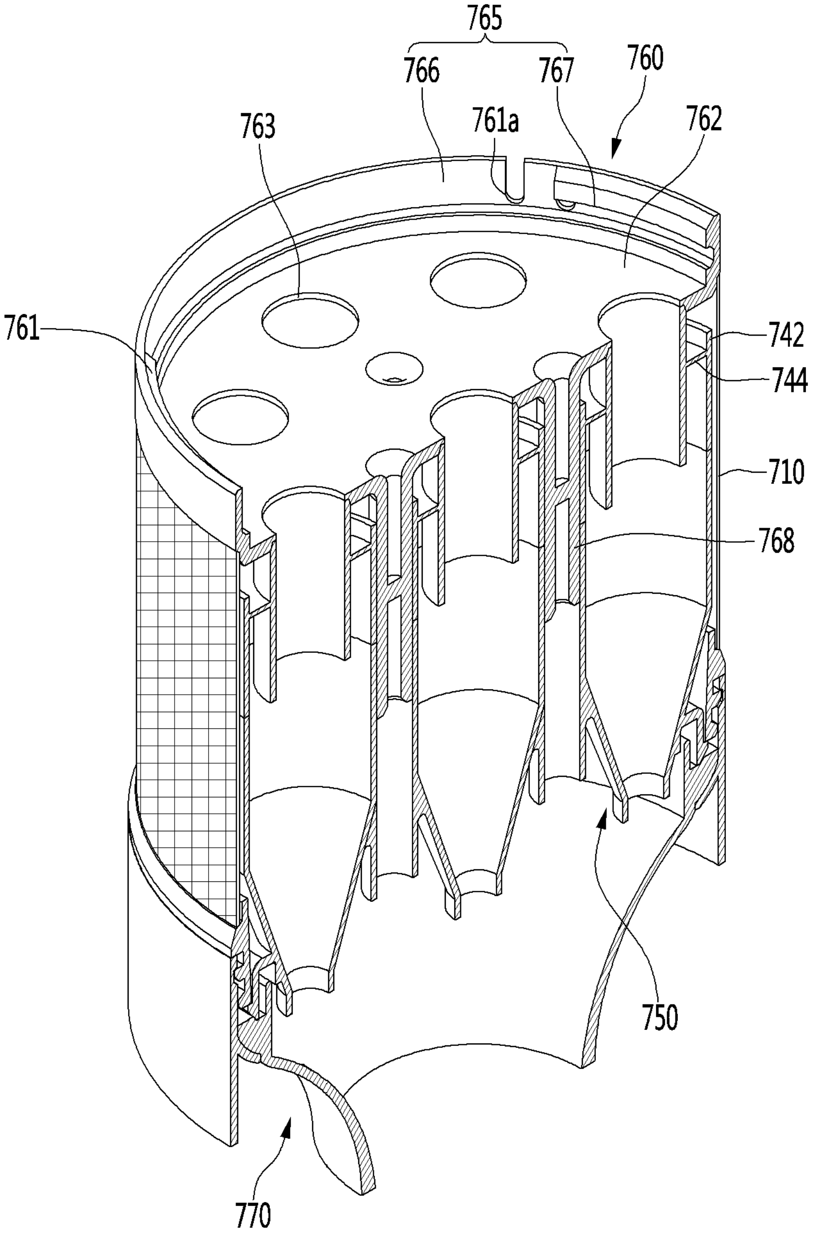
FIG. 10 is a cross-sectional perspective view of the dust separation module according to an embodiment.
Figure 11:
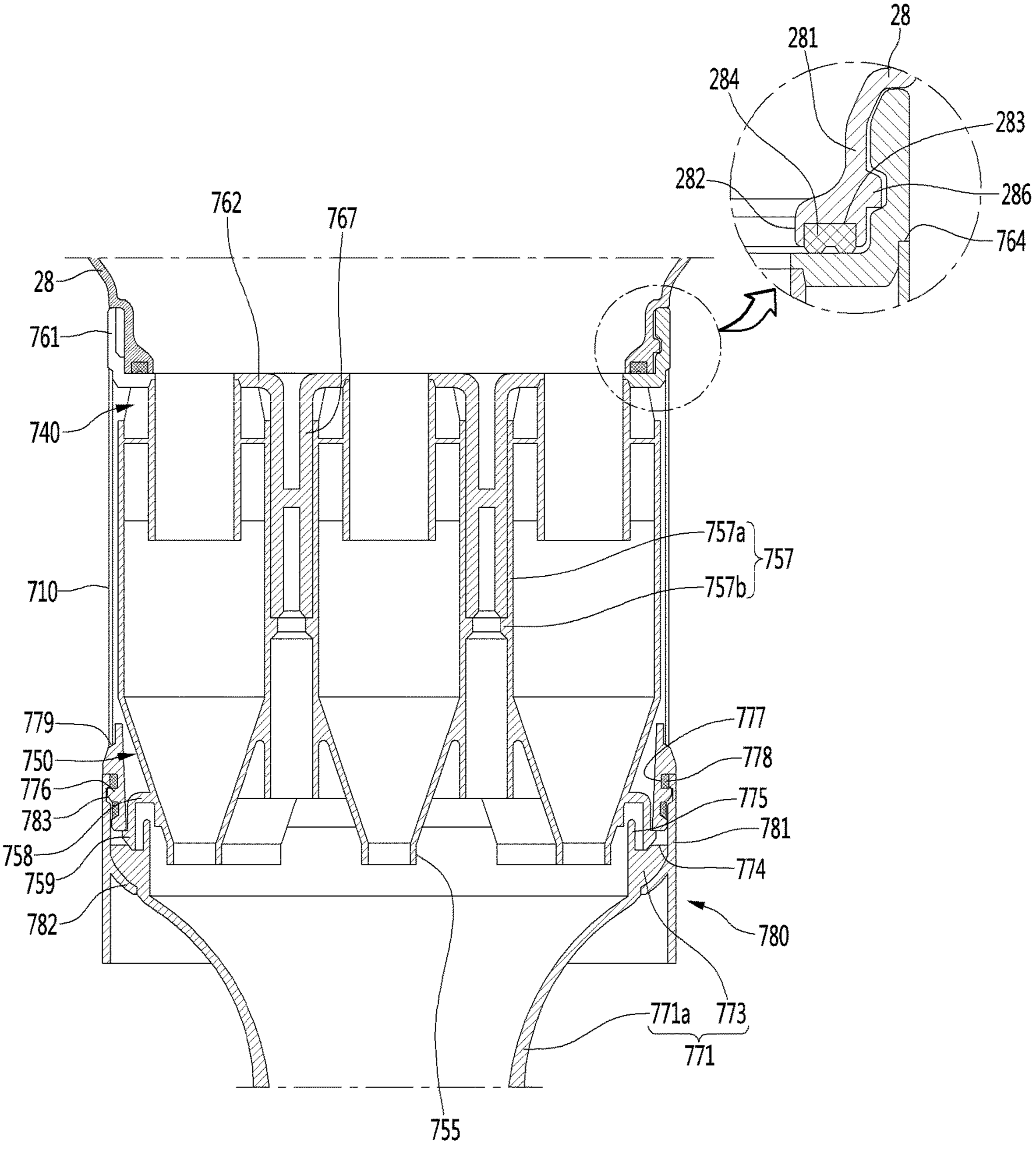
FIG. 11 is a cross-sectional view illustrating a state in which the dust separation module is coupled to a discharge guide according to an embodiment.

FIG. 9 is an exploded perspective view of the dust separation module according to an embodiment, FIG. 10 is a cross-sectional perspective view of the dust separation module according to an embodiment, and FIG. 11 is a cross-sectional view illustrating a state in which the dust separation module is coupled to the discharge guide according to an embodiment.

Referring to FIGS. 7 to 11, the dust separation module 700 according to this embodiment may include a filter unit 710 and a second cyclone unit 730.

Also, the dust separation module 700 may further include a storage unit 770.

The filter unit 710 may have a cylindrical shape and be opened upward and downward. Also, the filter unit 710 may include a plurality of openings through which air passes in a circumferential direction. For example, the filter unit 710 may include a mesh part for filtering the air while the air passes.

The filter unit 710 may surround the second cyclone unit 730. Thus, the air filtered while passing through the filter unit 710 may flow to the second cyclone unit 730.

The second cyclone unit 730 may include a cyclone module 750 and a guide module 740 communicating with the cyclone module 750.

Also, the dust separation module may further include a connection module 760 connecting the second cyclone unit 730 to the discharge guide 28.

The cyclone module 750 may include a plurality of cyclone bodies 752. The plurality of cyclone bodies 752 may be integrated with each other.

Although not limited, in the plurality of cyclone bodies 752, at least one cyclone body may be disposed at a central portion, and the rest of the cyclone bodies may be disposed to surround the cyclone body disposed at the central portion.

In this specification, the cyclone body disposed at the central portion may be called an inner cyclone body, and the cyclone bodies disposed to surround the inner cyclone body may be called outer cyclone bodies.

Each of the cyclone bodies 752 may include a first cyclone body 753 and a second cyclone body 754 extending downward from the first cyclone body 753.

For example, the first cyclone body 753 may have a cylindrical shape, and the second cyclone body 754 may have a cone shape or truncated cone shape.

The cyclone body 752 may include a dust discharge part 755 through which dusts are discharged.

The cyclone module 750 may further include a guide coupling part 757 coupled to the connection module 760.

The guide coupling part 757 may be disposed between a portion of the plurality of outer cyclone bodies and the inner cyclone body.

The guide coupling part 757 may include an accommodation part 757*a* accommodating a coupling body 768 provided on the connection module 760 and a body seating part 757*b* on which the coupling body 768 accommodated in the accommodation part 757*a* is seated.

In the state in which the coupling body 768 is seated on the body seating part 757*b*, the body seating part 757*b* and the coupling body 768 may be coupled to each other through a coupling member such as a screw at a lower portion of the body seating part 757*b*.

The cyclone module 750 may further include a storage unit coupling part 758 coupled to the storage unit 770.

The storage unit coupling part 758 may be disposed adjacent to the dust discharge part 755 in the cyclone body 752.

For example, the storage unit coupling part 758 may be integrated with the second cyclone body 754.

A coupling hook 759 may be provided on an outer circumferential surface of the storage unit coupling part 758.

The guide module 740 may be seated on the cyclone module 750 to guide the air to each of the cyclone bodies 752 and guide the air separated from the dusts in each of the cyclone bodies to the discharge guide 28.

The guide module 740 may include a guide body 742 including an air inlet 743. The guide body 742 may have a cylindrical shape having the same diameter as the first cyclone body 753.

The guide module 740 may further an air outlet 745 disposed inside the guide body 742.

The air outlet 745 may have a cylindrical shape. Also, the air outlet may have a vertical length greater than that of the guide body 742.

For example, the air outlet 745 may have an upper end higher than that of the guide body 742 and a lower end lower than that of the guide body 742.

Thus, when the guide module 740 is seated on the cyclone module 750, a portion of each of the air outlets 745 of the guide module 740 may be inserted into each of the cyclone bodies 752.

Also, the air may flow in an axial direction of the guide body 742. A flow guide rib 744 having a spiral shape to guide a flow of the air may be disposed between the inner circumferential surface of the guide body 742 and the air outlet 745 so that the air introduced into the guide body 742 in the axial direction flows along the inner circumferential surface of each of the cyclone bodies 752.

According to this embodiment, the air flows to the guide body 742 in the axial direction to prevent the guide module 740 from increasing in width.

Also, since the air outlet 745 of the guide module 740 is inserted into the cyclone body 752, a phenomenon in which the air introduced into the cyclone body 752 is directly discharged without being separated from the dusts may be reduced.

The connection module 760 may include a cover part 762 covering the second cyclone unit 730 (e.g., the guide module 740) and a connection part 761 to be connected to the discharge guide 28.

The cover part 762 may have, for example, a circular plate shape. The connection part 761 may extend upward from an edge of the cover part 762.

The cover part 762 may have a communication hole 763 communicating with the air outlet 745 of the guide module 740. The cover part 762 may have the communication hole 763 having the same number as the plurality of air outlets of the guide module 740.

When the cover part 762 is seated on the guide module 740, the communication hole 763 of the cover part 762 is aligned with the air outlet 745 of the guide module 740.

Thus, the air within the air outlet 745 may flow to the discharge guide 28 after passing through the communication hole 763.

A coupling body 768 coupled to the cyclone module 750 may be provided on the cover part 762.

The coupling body 768 may extend downward from the cover part 762. The coupling body 768 may have a vertical length greater than that of the guide module 740 so that the coupling body 768 is coupled to the cyclone module 750.

The guide module 740 may further include a body guide 746 through which the coupling body 768 passes.

Thus, when the cover part 762 is seated on the guide module 740, the coupling body 768 may pass through the body guide 746 and then be accommodated in the accommodation part 757*a* of the cyclone module 750. Although not limited, the body guide 746 may have a cylindrical shape.

Thus, the coupling body 768 may pass through the guide module 740 from an upper side of the guide module 740 and then be accommodated in the accommodation part 757*a* of the cyclone module 750.

A portion of the cover part 762 may be inserted into the filter unit 710 through an upper opening of the filter unit 710. A stopper 764 on which an upper end of the filter unit 741 is hung may be disposed outside of the cover part 762. An inserted depth of the cover part 762 may be determined by the stopper 764, and the stopper 764 may be seated on an upper end of the filter unit 710.

The discharge guide 28 may include a first coupling part 286 to be coupled to the connection part 761.

A portion of a lower portion of the discharge guide 28 may have a cylindrical shape, and the first coupling part 286 may be disposed on the cylindrical portion 281.

The first coupling part 286 may be a protrusion protruding from an outer circumferential surface of the cylindrical portion 281 to horizontally extend by a predetermined length.

A lower opening 282 communicating with the communication hole 763 may be defined in a bottom surface of the discharge guide 28 (e.g., the cylindrical portion 281). For example, one lower opening 282 may be defined in the bottom surface of the discharge guide 28 to communicate with the plurality of communication holes 763. Alternatively, a plurality of lower openings may be defined in the bottom surface of the discharge guide 28. The plurality of lower openings may communicate with the plurality of through-holes 763, respectively. That is, the number of openings 282 defined in the discharge guide 28 may be equal to or less than that of plurality of through-holes 763.

The connection part 761 may include a second coupling part 765 to be coupled to the discharge guide 28. The connection part 761 may be coupled to surround the cylindrical portion 281 in the discharge guide 28.

The second coupling part 765 may be disposed on an inner circumferential surface of the connection part 761. The second coupling part 765 may include a first groove 766 extending downward from an upper end of the connection part 761 and a second groove 767 extending in a direction crossing the first groove 766, e.g., a horizontal direction. That is, the second coupling part 765 may have an "L" shape.

In this embodiment, the first coupling part 286 may have a horizontal width greater than a horizontal width of the first groove 766.

Since a portion of the discharge guide 28 has a cylindrical shape, the connection module 760 may be coupled to the discharge guide 28 or released from the discharge guide 28 by the rotation operation of the connection module 760 through the second coupling part 765 of the connection part 761 and the first coupling part 286 of the discharge guide 28.

Particularly, the first coupling part 286 is aligned with the first groove 766 of the second coupling part 765 so that the connection module 760 is coupled to the discharge guide 28.

In this state, the first coupling part 286 is inserted into the first groove 766. Thus, the first coupling part 286 and the second groove 767 may be aligned with each other within the first groove 766. In this state, when the connection module 760 rotates in one direction, the first coupling part 286 may be inserted into the second groove 767 to complete the coupling between the connection module 760 and the discharge guide 28.

Here, the first groove 766 may have a recessed depth less than that of the second groove 767 so that the coupling force between the connection part 761 and the discharge guide 28 increases.

Also, the recessed depth of the first groove 766 may be equal to or less than a protruding thickness of the first coupling part 286.

In this case, while the first coupling part 286 disposed in the first groove 766 moves to the second groove 767, contact friction force between first coupling part 286 and the second groove 767 may increase to allow the coupling force between the connection part 761 and the discharge guide 28 to increase.

A slot 761*a* may be defined in a position of the connection part 761, which is adjacent to the second groove 767. The slot 761*a* may be recessed downward from the upper end of the connection part 761.

A sealing member 284 may be disposed between the discharge guide 28 and the connection module 760.

The sealing member 284 may be disposed on at least one of the discharge guide 28 and the connection module 760.

FIG. 11 illustrates an example in which the sealing member 284 is disposed on the discharge guide 28.

The discharge guide 28 may further include a sealing member coupling part 283 to be coupled to the sealing member 284.

The sealing member coupling part 283 may be disposed on, for example, a bottom surface of the discharge guide 28.

The sealing member 284 may have, for example, a ring shape, and the sealing member coupling part 283 may be a groove having a ring shape.

The sealing member 284 may be seated on the cover part 762 in the state in which the connection module 760 is coupled to the discharge guide 28.

The sealing member 284 may be disposed to surround the plurality of communication holes 763 in the state of being seated on the cover part 762. Also, the sealing member 284 may have an inner diameter greater than a diameter of the lower opening 282 of the discharge guide 28.

Thus, the air passing through the communication hole 763 may be prevented from leaking between the discharge guide 28 and the connection part 761 by the sealing member 284.

When the connection module 760 is coupled to the discharge guide 28 so that contact force between the sealing member 284 and the cover part 762 increases, the sealing member 284 may be pressed by the cover part 762.

According to this embodiment, the dust separation module 700 may be separated from the main body 2. In the state in which the dust separation module 700 is mounted on the main body 2, the sealing between the discharge guide 28 and the dust separation module 700 may be maintained by the sealing member 284. Thus, the air discharged from the dust separation module 700 may be prevented from leaking to the first cyclone unit 110.

Particularly, when the first coupling part 286 of the discharge guide 28 reaches the position at which the first coupling part 286 is aligned with the second groove 767 in the first groove 766 to improve the sealing performance, the sealing member 284 is pressed by the cover part 762. Also, in the state in which the sealing member 284 is pressed, the dust separation module 700 may rotate to allow the first coupling part 286 to move to the second groove 767.

The storage unit 770 may support a lower portion of the filter unit 710. The storage unit 770 may include an inner body 771 and an outer body 780 surrounding the inner body 771.

The inner body 771 may include a first portion **771*a* defining the second dust storage part 123. The first portion 771*a* of the inner body 771** may have a diameter that gradually decreases downward.

When the first portion **771*a* of the inner body 771 has the diameter that gradually decreases downward, the first dust storage part 121 may increase in capacity within the dust container 120**.

A relatively large volume of dust may be stored in the first dust storage part 121. If the first dust storage part 121 increases in capacity, a time taken to fully fill dust in the first dust storage part 121 may increase to reduce the number of operations for emptying dust.

The inner body 771 may further include a second portion 773 disposed on an upper portion of the first portion **171*a***.

For example, the second portion 773 of the inner body 771 may have a cylindrical shape. A portion of a lower portion of the second cyclone unit 730 may be inserted into the second portion 773 of the inner body 771.

The inner body 771 may further include a hook coupling part 774 to be coupled to the coupling hook 759. For example, the hook coupling part 774 may be disposed on the second portion 773.

The hook coupling part 774 may be a groove defined in the inner circumferential surface of the second portion of the inner body 771 or a hole passing through the second portion 773.

For example, when the storage unit coupling part 758 of the cyclone module 750 is accommodated in the inner body 771, the coupling hook 759 may be coupled to the hook coupling part 774 to couple the second cyclone unit 730 to the storage unit 770.

The inner body 771 may further include a leakage prevention rib 775 inserted into an inner region of the storage unit coupling part 758. An upper end of the leakage prevention rib 775 may be disposed higher than the hook coupling part 774 to prevent the air introduced into the storage unit 770 from flowing to the hook coupling part 774.

At least one sealer 778 for sealing the inner body 771 and the outer body 780 with respect to each other may be coupled to an outer circumferential surface of a second portion 773 of the inner body 771. The sealer 778 may have a ring shape. A sealer seating groove 777 in which the sealer 778 is seated may be defined in the outer circumferential surface of the second portion 773 of the inner body 771.

FIG. 11 illustrates an example in which the sealer 778 is coupled to the outer circumferential surface of the inner body 771. In this case, the plurality of sealers 778 may be disposed to be vertically spaced apart from each other.

At least one fixing protrusion 776 to be fixed to the outer body 780 may be disposed on the outer circumferential surface of the second portion 773 of the inner body 771.

The inner body 771 may further include a seating surface 779 on which the lower end of the filter unit 710 is seated.

For example, the seating surface 779 may be defined on the second portion 773. A portion of an outer diameter of the second portion 773 may be less than an inner diameter of the filter unit 710, and the other portion of the outer diameter of the second portion 773 may be greater than the inner diameter of the filter unit 710 so that the lower end of the filter unit 710 is seated on the second portion 773.

In this embodiment, the filter unit 710 may be fixed without using a separate fixing unit.

For example, in the state in which the lower end of the filter unit 710 is seated on the seating surface 779 of the storage unit 770, when the second cyclone unit 730 is coupled to the storage unit 770, an upper end of the filter unit 710 may contact the stopper 764 of the connection module 760. In this state, the vertical and horizontal movement of the filter unit 710 may be limited.

The outer body 780 may further include a cover part 781 surrounding the second portion 773 of the inner body 771 outside the inner body 771. The cover part 781 may have a cylindrical shape.

A protrusion coupling part 783 to which the at least one fixing protrusion 776 is fixed may be disposed on the cover part 781. For example, the protrusion coupling part 783 may be a groove.

A support rib 782 supporting a lower portion of the second portion 773 of the inner body 771 may be disposed inside the cover part 781.

Figure 12:
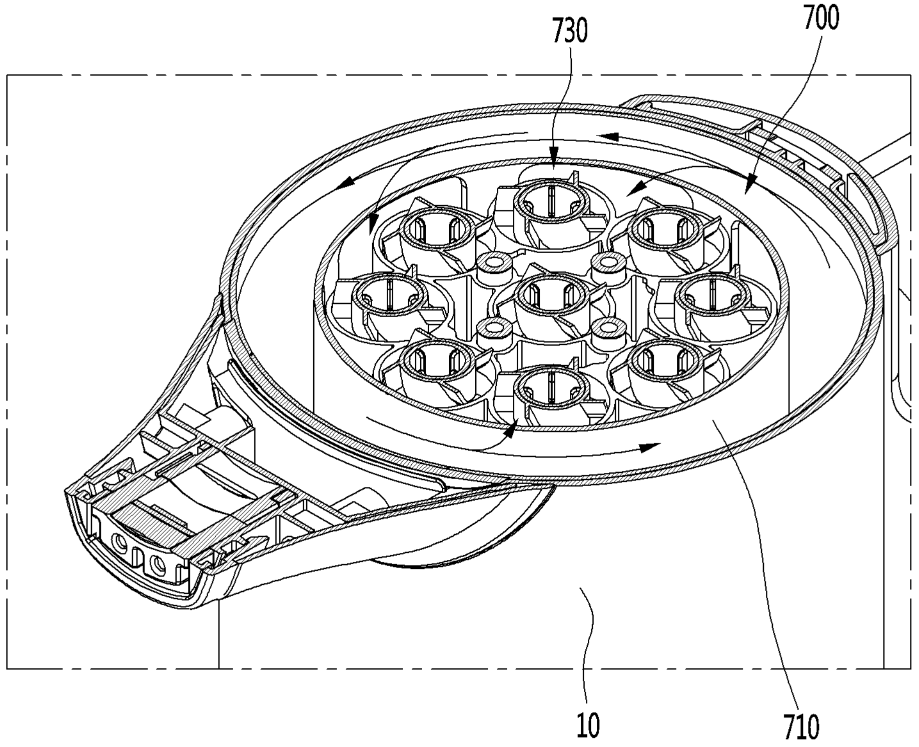
FIG. 12 is a transverse cross-sectional view illustrating an air flow in the cleaner according to an embodiment.
Figure 13:
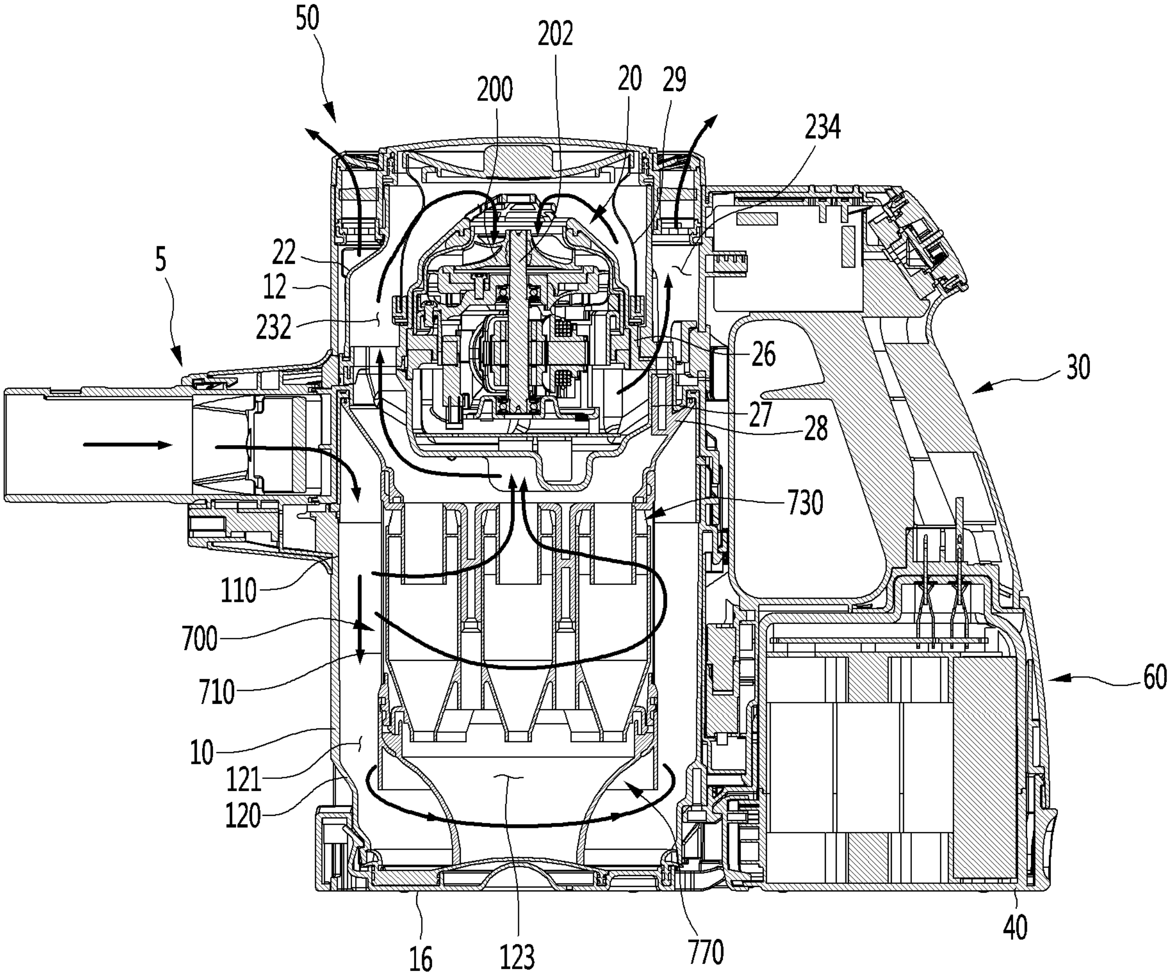
FIG. 13 is a longitudinal cross-sectional view illustrating the air flow in the cleaner according to an embodiment.

FIG. 12 is a transverse cross-sectional view illustrating an air flow in the cleaner according to an embodiment, and FIG. 13 is a longitudinal cross-sectional view illustrating the air flow in the cleaner according to an embodiment.

Referring to FIGS. 1 to 13, air and dust suctioned through the suction inlet 5 by an operation of the suction motor 20 are separated from each other while flowing along the inner circumferential surface of the first cyclone unit 110.

The dust separated from the air may flow downward and then be stored in the first dust storage part 121. The air separated from the dust may pass through the filter part 710 of the dust separation module 700 and then flow to the air inlet 743 of the second cyclone unit 730.

For example, the air separated from the dust in the first cyclone unit 110 may be filtered while passing through the filter part 710 and guided to the cyclone module 750 by the guide module 740 to perform the dust separation process again.

The dust separated from the air in the cyclone module 750 is discharged through the dust discharge part 755 to flow downward and then stored in the second dust storage part 123. On the other hand, the air separated from the dust in the cyclone module 750 is discharged to the discharge guide 28 through the air outlet 745.

The air discharged to the discharge guide 28 flows along the discharge guide 28 to move along the lower motor housing 27 and then ascends along the first air passage 232 within the flow guide 22. Also, the air of the first air passage 232 passes through the pre-filter 29.

The air passing through the pre-filter 29 passes through the suction motor 20 within the upper motor housing 26. The air flows into the suction motor 20 by the impeller 200 and then is discharged to the lower motor housing 27. Also, the air discharged to the lower motor housing 27 flows to the second air passage 234.

Also, the air flowing to the second air passage 234 passes through the filter unit 50 and then is discharged to the outside through the air exit 522.

As described above, to clean the dust separation module 700, the body cover 16 may rotate, and then, the dust separation module 700 may rotate in one direction. Then, when the dust separation module 700 is pulled, the dust separation module 700 may be separated from the main body 2.

According to the proposed embodiment, the dust separation module including the second cyclone unit may be separated from the main body to easily clean the second cyclone unit.

In addition, since the filter unit surrounding the second cyclone unit is separated from the main body together with the second cyclone unit, the filter unit may be easily cleaned.

In addition, when the dust separation module is separated from the main body, since there is no structure in the dust container, the inner circumferential surface of the dust container may be easily cleaned.

In addition, since the sealing member is provided on the discharge guide or the dust separation module, the sealed state of the contact part between the discharge guide and the dust separation module may be maintained in the state in which the dust separation module is mounted on the main body.

Particularly, since the dust separation module is coupled to the main body by the rotation of the dust separation module in the state in which the sealing member is pressed, the sealing performance may be more improved.

In addition, when the dust separation module is coupled to the main body in the state in which the sealing member is pressed, the friction force between the first coupling part of the discharge guide and the first groove, which are provided for the coupling may increase to stably maintain the coupled state.

In addition, since the upper end of the filter unit contacts the connection module, and the lower end of the filter unit is seated on the storage unit, it may be unnecessary to provide a separate fixing unit for fixing the position of the filter unit, thereby realizing the simplified structure.

What is claimed is:

1. A cleaner comprising:

a suction inlet configured to receive air and dusts;

a main body comprising a first cyclone unit configured to separate the air and the dusts from each other;

a suction motor disposed in the main body and configured to generate suction force, wherein an entirety of the suction motor is disposed above a longitudinal center axis of the suction inlet;

a dust separation module separably connected to the main body, the dust separation module comprising a second cyclone unit configured to separate the dusts from air discharged from the first cyclone unit, wherein an entirety of the dust separation module is separably connected to the main body and disposed below the longitudinal center axis of the suction inlet;

a cover configured to open and close a bottom of the main body; and a filter unit separably connected to a top of the main body, the filter unit defining air exits configured to discharge the air that has passed through the second cyclone unit, wherein the filter unit is configured to be disposed above the top of the main body and to be separated from the top of the main body, and wherein the dust separation module is configured to be decoupled from the main body by rotating relative to the main body and to be separated from the bottom of the main body based on the cover opening the bottom of the main body.

2. The cleaner of claim 1, wherein the main body comprises a dust container configured to store the dusts separated in the first cyclone unit, the cover being configured to open and close the dust container, and wherein the dust separation module is configured to, based on the cover opening the dust container, be exposed to an outside of the main body.

3. The cleaner of claim 2, wherein the dust container comprises a discharge opening, and wherein the dust separation module is configured to be separated to a lower side of the dust container through the discharge opening.

4. The cleaner of claim 1, wherein the main body further comprises:

a motor housing configured to accommodate the suction motor; and a discharge guide connected to the dust separation module and configured to guide the air discharged from the dust separation module, wherein at least a portion of the motor housing is disposed within the discharge guide, and wherein, in a state in which the dust separation module is separated from the main body, the motor housing is exposed to an outside of the main body.

5. The cleaner of claim 4, wherein the motor housing comprises an upper motor housing configured to surround an upper side of the suction motor and a lower motor housing configured to cover a lower side of the suction motor, and wherein the discharge guide surrounds the lower motor housing and defines a passage of the air discharged from the second cyclone unit.

6. The cleaner of claim 4, wherein the longitudinal center axis of the suction inlet passes through the discharge guide.

7. The cleaner of claim 1, wherein the dust separation module further comprises a filter part configured to filter the air separated from the dusts in the first cyclone unit.

8. The cleaner of claim 7, wherein the filter part surrounds the second cyclone unit.

9. The cleaner of claim 7, wherein the main body further comprises a discharge guide connected to the dust separation module and configured to guide the air discharged from the dust separation module, wherein the dust separation module further comprises a connection module connected to the second cyclone unit and coupled to the discharge guide, wherein the discharge guide comprises a first coupling part configured to be coupled to the connection module, wherein the connection module comprises a second coupling part configured to be coupled to the first coupling part, the second coupling part comprising:

a first groove configured to receive the first coupling part along a first direction; and a second groove that extends from the first groove in a second direction crossing the first direction, and wherein the first coupling part and the second coupling part are configured to couple to each other by rotation of the connection module.

10. The cleaner of claim 9, further comprising:

a sealing member configured to block air leakage between the connection module and the discharge guide; and a sealing member coupling part that supports the sealing member and that is provided on the discharge guide, wherein the connection module comprises a cover part configured to cover the second cyclone unit and a connection part which extends from the cover part and on which the second coupling part is provided, and wherein the sealing member contacts the cover part.

11. The cleaner of claim 9, further comprising a sealing member configured to block air leakage between the connection module and the discharge guide, wherein the first coupling part is configured to:

based on the first coupling part being disposed in the first groove and aligned with the second groove, apply pressure to the sealing member, and insert into the second groove by rotation of the connection module in a state in which the sealing member is pressed.

12. The cleaner of claim 8, wherein the dust separation module further comprises a storage unit coupled to the second cyclone unit and configured to store the dusts separated in the second cyclone unit.

13. The cleaner of claim 12, wherein the main body further comprises a discharge guide connected to the dust separation module and configured to guide the air discharged from the dust separation module, wherein the dust separation module further comprises a connection module connected to the second cyclone unit and coupled to the discharge guide, and wherein the filter part has an upper end contacting the connection module and a lower end seated on the storage unit.

14. The cleaner of claim 9, further comprising a sealing member configured to block air leakage between the connection module and the discharge guide, wherein the discharge guide defines a lower opening at a lower end that faces the connection module, the lower opening being configured to accommodate at least a portion of the sealing member.

15. The cleaner of claim 14, wherein the lower end of the discharge guide is spaced apart from an upper surface of the connection module.

16. The cleaner of claim 15, wherein the sealing member defines a recess spaced apart from the upper surface of the connection module.

17. A cleaner comprising:

a main body;

a suction inlet configured to receive air and dusts; and a filter unit separably connected to a top of the main body, the filter unit defining air exits configured to discharge the air, wherein the main body comprises:

a suction motor configured to generate suction force to suction the air through the suction inlet, wherein an entirety of the suction motor is disposed above a longitudinal center axis of the suction inlet, a motor housing configured to accommodate the suction motor, a first cyclone unit configured to separate the dusts from the air suctioned through the suction inlet, a dust separation module comprising a second cyclone unit configured to separate the dusts from air discharged from the first cyclone unit, a discharge guide separably coupled to the dust separation module and configured to surround at least a portion of the motor housing, wherein an entirety of the dust separation module is separably coupled to the discharge guide and disposed below the longitudinal center axis of the suction inlet, a passage that is defined between the discharge guide and the motor housing and that is configured to guide air discharged from the second cyclone unit, and a cover configured to open and close a bottom of the main body, wherein the filter unit is configured to be disposed above the top of the main body and to be separated from the top of the main body, and wherein the dust separation module is configured to be decoupled from the main body by rotating relative to the main body and to be separated from the bottom of the main body based on the cover opening the bottom of the main body.

18. The cleaner of claim 17, wherein the motor housing comprises an upper motor housing configured to cover a portion of an upper portion of the suction motor and a lower motor housing configured to cover a portion of a lower portion of the suction motor, and wherein the discharge guide surrounds the lower motor housing.

19. A cleaner comprising:

a main body;

a suction inlet configured to receive air and dusts; and a filter unit separably connected to a top of the main body, the filter unit defining air exits configured to discharge the air, wherein the main body comprises:

a suction motor disposed in the main body and configured to generate suction force, wherein an entirety of the suction motor is disposed above a longitudinal center axis of the suction inlet, a first cyclone unit configured to separate the dusts from the air received through the suction inlet, a dust separation module comprising a second cyclone unit configured to separate the dusts from air discharged from the first cyclone unit, a discharge guide separably coupled to the dust separation module and configured to guide air discharged from the second cyclone unit, wherein an entirety of the dust separation module is separably connected to the discharge guide and disposed below the longitudinal center axis of the suction inlet, and a cover configured to open and close a bottom of the main body, wherein the discharge guide comprises a first coupling part configured to be coupled to the dust separation module, and the dust separation module comprises a second coupling part configured to be coupled to the first coupling part, wherein the filter unit is configured to be disposed above the top of the main body and to be separated from the top of the main body, and wherein the dust separation module is configured to be decoupled from the main body by rotating relative to the main body and to be separated from the bottom of the main body based on the cover opening the bottom of the main body.

20. The cleaner of claim 19, wherein the second coupling part comprises:

a first groove that accommodates the first coupling part; and a second groove extending from the first groove in a direction crossing a direction in which the first coupling part is accommodated in the first groove.

* * * * *